(12) United States Patent
Mizumachi et al.

(10) Patent No.: US 8,369,684 B2
(45) Date of Patent: Feb. 5, 2013

(54) DATA PROCESSING APPARATUS AND DATA PROCESSING METHOD

(75) Inventors: Koji Mizumachi, Kanagawa (JP); Shingo Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 12/335,855

(22) Filed: Dec. 16, 2008

(65) Prior Publication Data

US 2009/0157988 A1 Jun. 18, 2009

(30) Foreign Application Priority Data

Dec. 18, 2007 (JP) .................................. 2007-326353

(51) Int. Cl.
*H04N 9/80* (2006.01)
(52) U.S. Cl. ........................................................ 386/248
(58) Field of Classification Search .................. 386/241, 386/248
See application file for complete search history.

(56) References Cited

U.S. PATENT DOCUMENTS

| | | | |
|---|---|---|---|
| 6,711,344 B1* | 3/2004 | Ito et al. | 386/344 |
| 2003/0233359 A1* | 12/2003 | Adolph et al. | 707/6 |
| 2008/0043587 A1* | 2/2008 | Gandolph et al. | 369/47.15 |

FOREIGN PATENT DOCUMENTS

| | | |
|---|---|---|
| JP | 11-265263 A | 9/1999 |
| JP | 2000-307978 A | 11/2000 |
| JP | 2004-021991 A | 1/2004 |
| JP | 2005-536915 T | 12/2005 |

* cited by examiner

*Primary Examiner* — Thai Tran
*Assistant Examiner* — William Tran
(74) *Attorney, Agent, or Firm* — Wolf, Greenfield & Sacks, P.C.

(57) ABSTRACT

Disclosed is a data processing apparatus that includes a plurality of ports inputting and outputting a clip including a plurality of types of essence, a memory storing the clip when recording or playing back of the clip from a recording medium, and a generator storing types of essence in separate regions of the memory, and generate identification information identifying the types of essence, while generating linking information indicating an association between regions of the memory storing one of the types of essence as a master essence and regions of the memory storing the remaining types of essence. The apparatus further includes a control unit outputting the master essence in the regions and the remaining essence in the regions associated therewith via linking information from the designated ports when the master essence in the clip of the video data subjected to playback request designating the ports is stored in the memory.

8 Claims, 14 Drawing Sheets

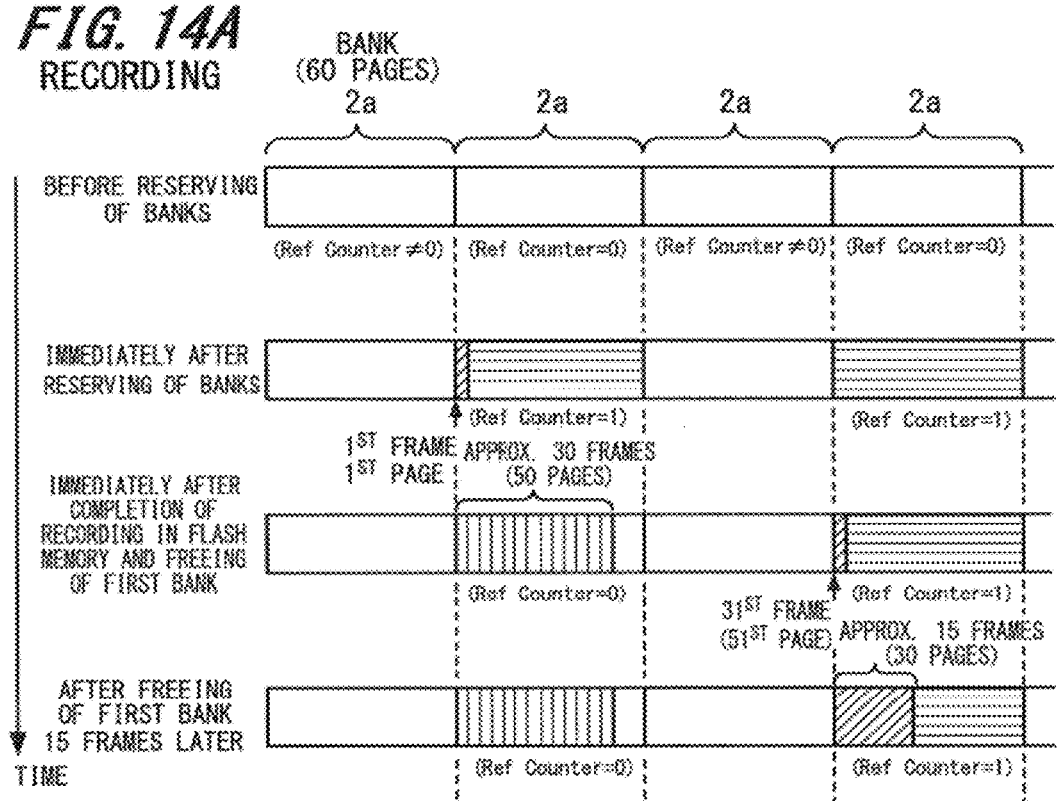

US 8,369,684 B2

DATA PROCESSING APPARATUS AND DATA PROCESSING METHOD

CROSS REFERENCES TO RELATED APPLICATIONS

The present invention contains subject matter related to Japanese Patent Application JP 2007-326353 filed in the Japanese Patent Office on Dec. 18, 2007, the entire contents of which being incorporated herein by reference.

BACKGROUND OF THE INVENTION

1. Field of the Invention

The present invention relates to a data processing apparatus, such as an AV (audio/video) server for television broadcasts or a non-linear editor, where a non-linear recording medium is accessed from two or more input/output ports to record and/or play back video data.

2. Description of the Related Art

AV servers and non-linear editors with a plurality of input/output ports and a large-capacity recording medium (such as a hard disk drive or flash memory) as main storage that is capable of non-linear access are getting more widespread as appliances that allow AV data to be recorded, played back, and edited for television broadcasts.

In an AV server or non-linear editor, to prevent all of the plurality of input/output ports from accessing the main storage at the same time, access to the main storage from the respective input/output ports is normally managed using time slots (see, for example, Japanese Unexamined Patent Application Publication No. 2000-307978 (Paragraphs 0008, 0046, and 0047)). Also, to make it possible for each input/output port to input and output AV data at a predetermined rate irrespective of such time slots, a memory is provided for temporarily storing AV data during recording and playback into and from the main storage.

FIG. 1 is a diagram schematically showing one method of managing a memory used to temporarily store AV data in an AV server or non-linear editor of the related art. For example, if there are five input/output ports numbered Port #1 to Port #5, the entire storage region of the memory M is divided into and managed as five regions M1 to M5 that are dedicated to the ports Port #1 to Port #5.

When AV data is inputted into the input/output port Port #1, the AV data is written for each frame into the region M1 of the memory M. When a predetermined amount of AV data has accumulated in the region M1, the AV data in the region M1 is recorded in the main storage MS at the timing of a time slot assigned to the input/output port Port #1.

In the same way, when AV data is outputted from the input/output port Port #2, AV data inside the main storage MS is written into the region M2 of the AV data memory M at the timing of the time slot assigned to the input/output port Port #2. Each frame in the AV data written into the region M2 is outputted from the input/output port Port #2. The same process is also carried out for the input/output ports Port #3 to Port #5.

However, the functions of an AV server and a non-linear editor include a function called "chasing playback" where AV data inputted into a given input/output port is immediately outputted from another input/output port. As examples, chasing playback is used when replaying highlights during a live sports broadcast and when editing AV data shot on-location during a news program.

When an AV server or non-linear editor carries out chasing playback, AV data that has been recorded in the main storage is played back and outputted.

SUMMARY OF THE INVENTION

However, with the typical chasing playback method described above, after AV data has been inputted, such AV data may not be outputted for a total of the waiting time due to time slot management during recording and the waiting time due to time slot management during playback.

Since this reduces responsiveness for chasing playback, there have been delays when showing replays or editing footage during the sports broadcasts and news programs described above. Moreover, in recording a clip (a segment of data for continuous playback) into the AV server or non-linear editor, the clip may not be recorded as one file; however, a plurality of essence (i.e., heterogeneous data: e.g. video data, audio data) forming the clip may individually be recorded as separate files (i.e., video file, audio file).

It is desirable to improve the responsiveness of chasing playback in a data processing apparatus, such as an AV server or a non-linear editor that records and plays back clips by accessing a non-linear recording medium from two or more input/output ports, specifically, in recording a plurality of essence forming a clip as separate files.

An embodiment of the invention includes a plurality of ports configured to input and output a clip including a plurality of types of essence, a memory configured to store the clip when the clip input into the ports is recorded on or played back from a recording medium, a generator configured to generate linking information and identification information, and a control unit. The generator stores the plurality of types of essence in separate regions of the memory, and generates the identification information that identifies the types of essence stored in the separate regions of the memory while generating the linking information that indicates an association between a region storing one of the types of essence as a master essence and regions storing remaining types of essence. The control unit outputs, when the master essence in the clip of the video data subjected to the playback request that designates one of ports is stored in memory, the master essence in the regions and the remaining essence stored in the regions of the memory associated therewith is stored via linking information from the designated port.

The embodiment of the invention can be applied to a playback method for a recording and/or playback apparatus including a port configured to input and output a clip including a plurality of types of essence, and a memory configured to store the clip when the clip input into the ports is recorded on or played back from a recording medium.

The method includes a first step of storing the plurality of types of essence in separate regions of the memory, and generating the identification information that identifies the types of essence stored in the separate regions of the memory while generating the linking information that indicates an association between a region storing one of the types of essence as a master essence and regions storing the remaining types of essence.

The method further includes a second step of outputting, when the master essence in the clip of the video data subjected to the playback request that designates one of ports is stored in a memory, the master essence stored in the regions and the remaining essence stored in the regions of the memory associated therewith via linking information from the designated ports.

According to the embodiment of the invention, in recording and/or playback of a clip that is input into a port, a plurality of types of essence in the clip is temporally stored in respective regions of the memory during recording or playback of the clip on a recording medium. Then, the linking information is generated that indicates an association between a region storing one of the types of essence as a master essence and regions storing remaining types of essence. Further, identification information identifying types of essence is generated in the regions of the memory.

When there is a playback request for a clip, a search is conducted using the identification information to find out whether the master essence in the clip subjected to the playback request has been stored in the memory. If the master essence in the clip has been stored in the memory, the master essence stored in the memory and the remaining essence stored in the memory associated with the master essence via the linking information stored in the memory are output without making the clip being played back from the non-linear recording medium.

During chasing playback, the clip to be played back will have only just been stored in the memory so that the clip can be recorded on the recording medium. This means that there is a high probability of the clip still being stored in the memory (i.e., a high probability that the region in the memory that stored such clip will not have been overwritten to record or play back other data).

Accordingly, there will be a large number of cases where chasing playback can be carried out at high speed using the memory as a cache memory without having to access the recording medium (i.e., without being affected by an access wait time for the recording medium due to time slot management). In this manner, it is possible to improve the responsiveness of chasing playback. Even when the plurality of types of essence is stored as separate files, it may not be necessary to conduct a search for whether the memory includes each type of essences but to only conduct a search for whether the memory includes one type of essence (master essence), search processing can be simplified.

According to the embodiments of the present invention, it is possible to improve the responsiveness of chasing playback in a data processing apparatus that records and plays back data by accessing a recording medium from input/output ports. Further, even a plurality of types of essence forming a clip are recorded as separate files, search processing conducted in the memory that temporally stores the clip can be simplified.

BRIEF DESCRIPTION OF THE DRAWINGS

FIGS. 14A and 14B are diagrams showing an example of how chasing playback is carried out using the bank memory.

DESCRIPTION OF THE PREFERRED EMBODIMENTS

An example where an embodiment of the present invention is applied to an AV server for television broadcasts will now be described in detail with reference to the attached drawings.

Figure 2:
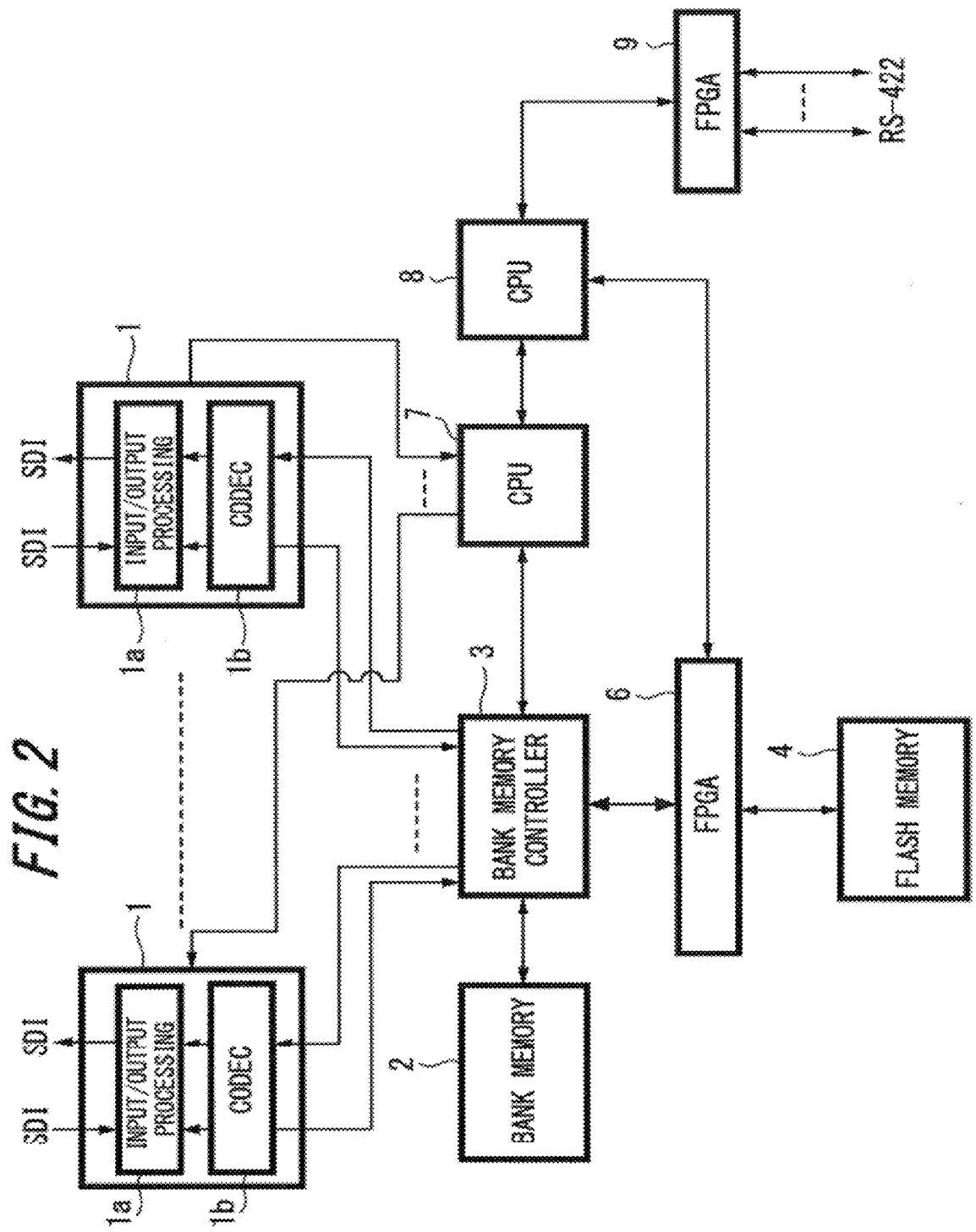
FIG. 2 is a diagram showing one example of the overall configuration of an AV server to which an embodiment of the present invention has been applied.

First, the overall configuration of an AV server to which an embodiment of the present invention has been applied will be described with reference to FIG. 2. The AV server includes the following components:

a plurality of (e.g., five) SDI input/output ports 1 that input and output serial digital signals according to SDI standard;

a bank memory 2;

a bank memory controller 3 for reading and writing AV data from and into the bank memory 2;

a large-capacity flash memory 4 as main storage that records AV data inputted into the respective SDI input/output ports 1;

an FPGA 6 provided with a low-performance processor for controlling the flash memory 4;

a CPU 7 that controls the SDI input/output ports 1 and the bank memory controller 3;

a CPU 8 that controls the entire AV server; and an FPGA 9 provided with a low-performance processor which converts the protocol of record/playback commands for each SDI input/output port 1 that have been received from the periphery according to RS-422 protocol, sends the converted commands to the CPU 8, and converts a status received from the CPU 8 to RS-422 protocol and sends the converted status to the periphery as a reply.

Each SDI input/output port 1 includes an input/output processing unit 1a and a codec 1b. During recording the clip, a serial digital signal according to SDI standard that is inputted into an SDI input/output port 1 is converted to parallel AV data (i.e., two types of essence including video data, audio data forming a clip) by the input/output processing unit 1a, is encoded (i.e., compressed) using Long GOP by the codec 1b, and is sent to the bank memory controller 3.

Also, during playback the clip, the AV data sent to the SDI input/output port 1 from the bank memory controller 3 is decoded (i.e., decompressed) using Long GOP by the codec 1b, is converted to a serial digital signal according to SDI standard by the input/output processing unit 1a, and is outputted.

The bank memory 2 is a memory that temporarily stores video data and audio data forming the clip in separate regions thereof during recording and playback of the clip on the flash memory 4, and has a capacity of 2 GB.

Note that although not shown in the drawings, the AV server may be provided with an external interface so that a plurality of AV servers of the same configuration can be connected and the flash memory 4 of another AV server can be accessed from the SDI input/output ports 1 of the respective AV servers. During recording or playback when the flash memory 4 is being accessed from an SDI input/output port 1 of another AV server, the AV data is temporarily held in the bank memory 2.

Figure 3:
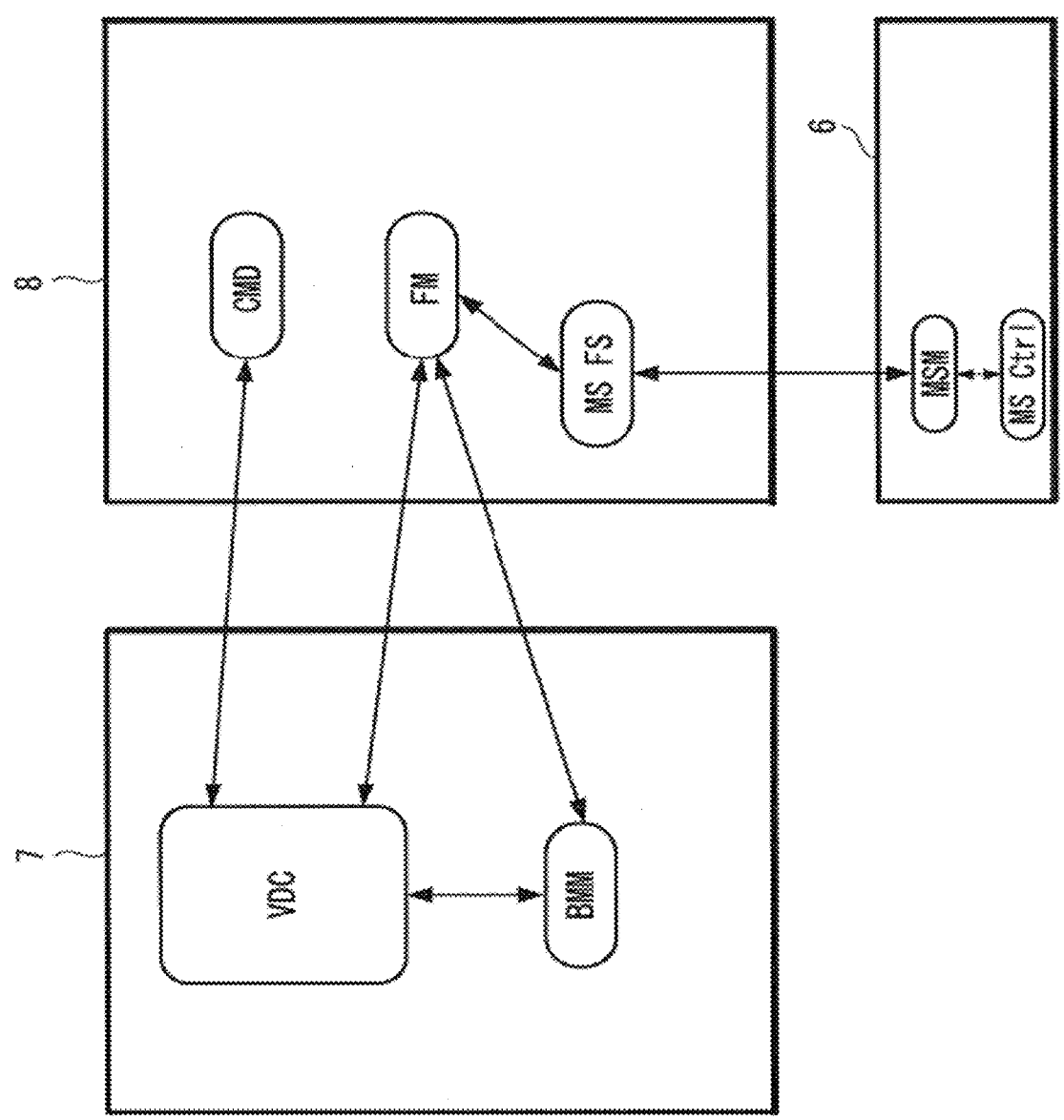
FIG. 3 is a diagram showing the module structure of programs stored in a CPU 7, a CPU 8, and an FPGA 6 in FIG. 2.

Various programs are stored in internal memories of the CPU 7, the CPU 8 and the processor of the FPGA 6. FIG. 3 is a diagram showing the module structure of such programs.

The following programs are stored in the memory of the CPU 8:

a program CMD that interprets commands from the FPGA 9;

a file system MSFS that manages AV data in the flash memory 4; and a file manager FM that is a higher level program than the file system MSFS.

The following programs are stored in the memory of the CPU 8:

a program VDC that controls each SDI input/output port 1 and also controls the bank memory controller 3 to carry out reads and writes of AV data into the bank memory 2;

a bank memory manager BMM that manages the bank memory 2 and controls the bank memory controller 3.

The following programs are stored in the memory of the processor of the FPGA 6:

a main storage manager MSM that controls access from each SDI input/output port 1 to the flash memory 4 using time slots; and a main storage controller MSCtrl that controls the flash memory 4.

Out of the modules shown in FIG. 3, the bank memory manager BMM is newly provided according to an embodiment of the present invention and the other modules are existing programs. Although the relationships between the modules (i.e., the communication between modules) have been drawn using arrows in FIG. 3, if such relationships are redrawn centered on the bank memory manager BMM, the result is shown in FIG. 4.

Figure 4:
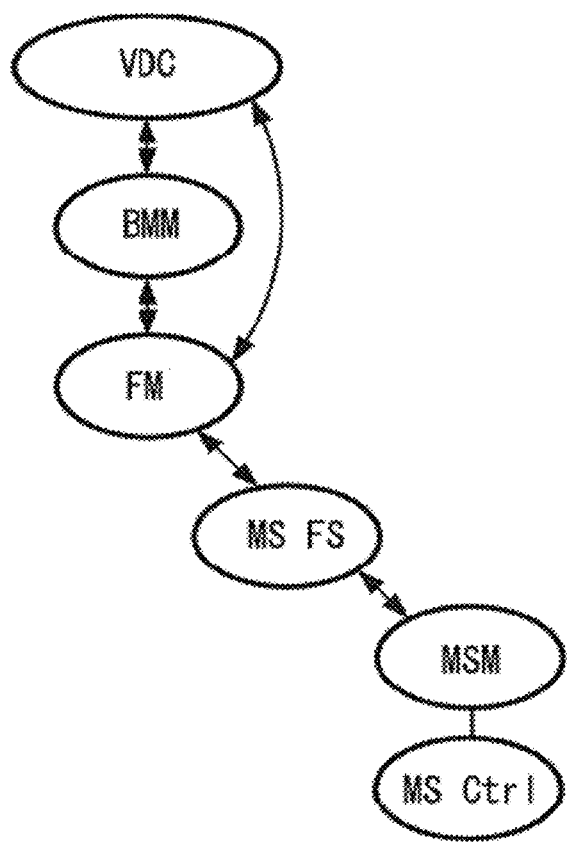
FIG. 4 is a diagram showing the relationship between a bank memory manager and other modules.

As shown in FIG. 4, the bank memory manager BMM is provided between each program VDC and the file manager FM and communicates with the program VDC and the file manager FM. However, not all of the communication between the program VDC and the file manager FM is carried out via the bank memory manager BMM and the program VDC also communicate directly with the file manager FM.

The bank memory manager BMM includes the following functions (a) to (d):
(a) Region management of the bank memory 2;
(b) Reserving control of the bank memory 2;
(c) Freeing control of the bank memory 2; and
(d) Management of a usage history of the bank memory 2.

Figure 1:
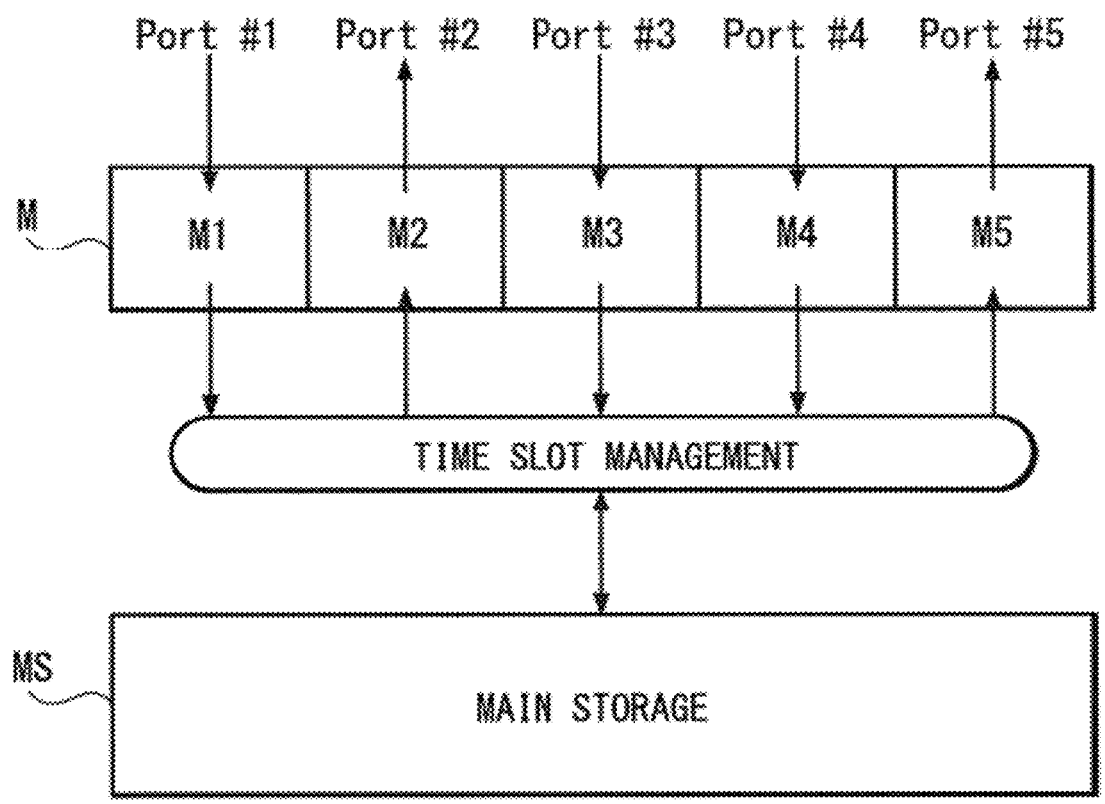
FIG. 1 shows how a memory for temporarily storing AV data is managed in an AV server of related art.
Figure 5:
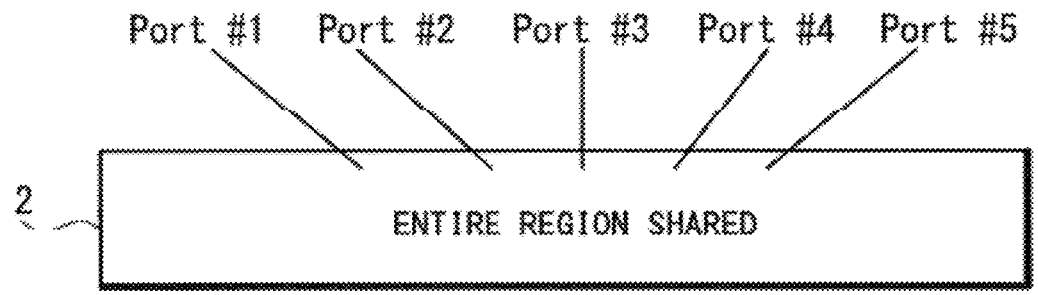
FIG. 5 is a diagram showing how a bank memory is managed by the bank memory manager.

Of these, as schematically shown in FIG. 5, the region management handles the entire region of the bank memory 2 as a region that is shared by all of the SDI input/output ports 1 (indicated as Port #1 to Port #5). That is, unlike the existing management method shown in FIG. 1, the bank memory 2 is not divided into regions that are dedicated to each SDI input/output port 1.

Figure 6:
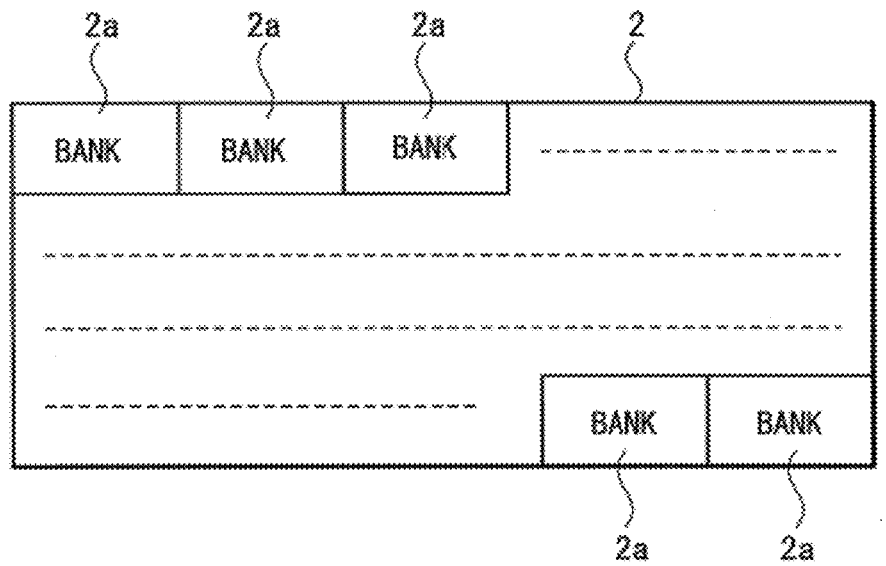
FIG. 6 is a diagram showing banks inside the bank memory.

Also, as shown in FIG. 6, in the region management, the entire region of the bank memory 2 is partitioned into a plurality of banks 2a that each store one type of essence (i.e., one of video data and audio data). Note that the banks 2a have a fixed size such as 8 MB in this example. If the bank memory 2 has a capacity of 2 GB, the number of banks 2a is 341 and each bank 2a is provided with an index indicating an array location number is provided.

Figure 7:
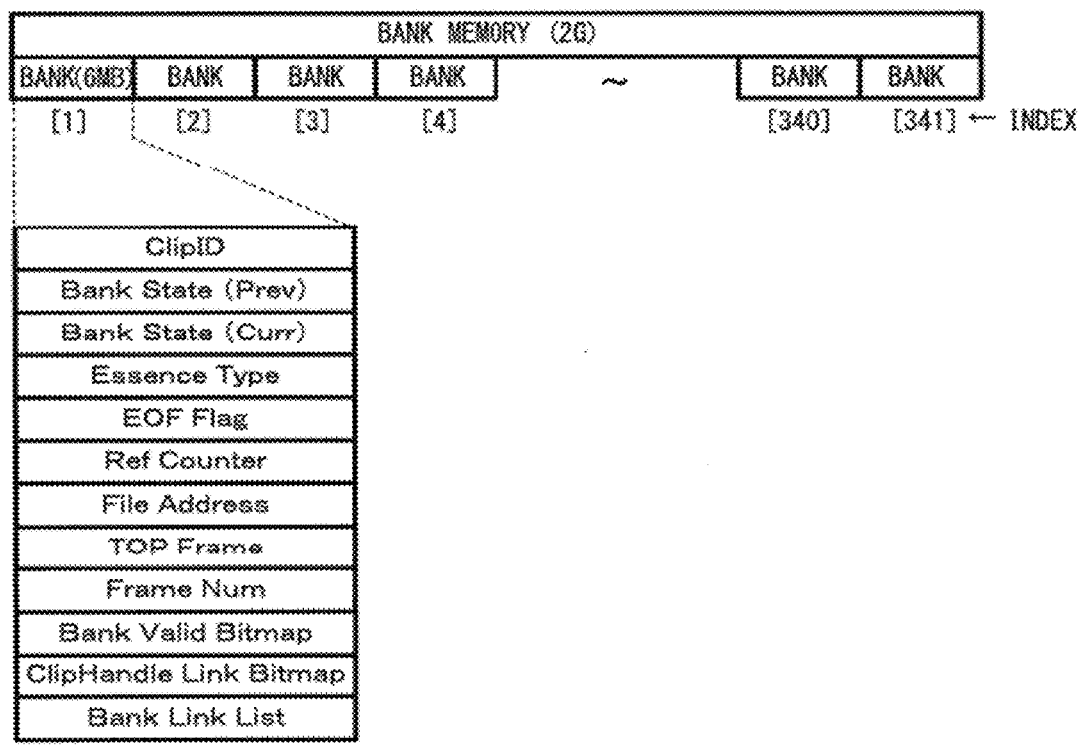
FIG. 7 is a diagram showing bank management information.

Also, in the region management, each bank 2a is managed by bank management information such as that shown in FIG. 7. In this bank management information, "Clip ID" indicates identification information to identify a clip using the bank 2a in the bank memory 2.

"Bank State (Prev)" indicates the previous state of the bank 2a (never used, reserved, or freed).

"Bank State (Curr)" indicates the current state of the bank 2a.

"Essence Type" indicates types of essence (video data or audio data) stored in the bank 2a.

"EOF Flag" indicates information on whether the video file or audio file contains the end of file (EOF).

"Ref Counter" is information showing the number of SDI input/output ports 1 that are presently using the bank 2a. When the bank 2a in question is not being used by any of the SDI input/output ports 1, the value of "Ref Counter" is set at "0". Whenever one SDI input/output port 1 reserves the bank 2a in question by reserving control of the bank memory 2 in (b) described above, the "Ref Counter" value of such bank 2a is incremented by one, and whenever one SDI input/output port 1 frees the bank 2a in question by the freeing control of the bank memory 2 in (c) described above, the "Ref Counter" value of such bank 2a is decremented (such reserving control and freeing control will be described later with reference to FIGS. 9 to 12).

FIG. 7 is a diagram showing bank management information.

"File Address" is an address showing the order of the video files or audio files stored in the bank 2a counted from the start of file (SOF).

"Top Frame" is the number of the head frame of the video files or audio files stored in the bank 2a.

"Frame Num" indicates the number of frames of the video file or audio file stored in the bank 2a.

"Bank Valid Bitmap" is a bitmap indicating validity (read or written) or invalidity of each page in the bank 2a. One page is the number of bytes that indicates a unit for recording and playback for the flash memory 4 (see FIG. 2).

"ClipHandle Link Bitmap" is a bitmap indicating reserved "ClipHandle". "ClipHandle" implies the concept corresponding to the file handle in the file input/output. For example, the ClipHandle is used to identify the clip currently reproduced when seamlessly reproducing the identical clip having an identical Clip ID.

Bank Link List is linking information showing the association between a bank 2a that stores video data as master essence and a bank 2a that stores audio data, frame of which is synchronized with the video data, in the bank memory 2. Bank Link List for each bank 2a includes an index of the bank 2a associated via the bank 2a in question (creating and updating the linking information will be described later with reference to FIGS. 15A, 15B, and FIGS. 16A, 16B).

Note that the information such as "Essence Type", "EOF Flag", "File Address", or "Frame Num" is prepared by the bank 2a in question being reserved to hold video files or audio files by any of the SDI input/output ports 1, and even if the value of "Ref Counter" subsequently becomes zero due to the bank 2a in question being freed (that is, even if the bank 2a in question becomes no longer used by any of the SDI input/ output ports 1) the information will remain. The data is kept to make it possible to also search banks 2a that are not presently being used and to use the data stored in such banks 2a during the processing of playback that will be described later with reference to FIG. 11 and FIG. 12.

Figure 8:
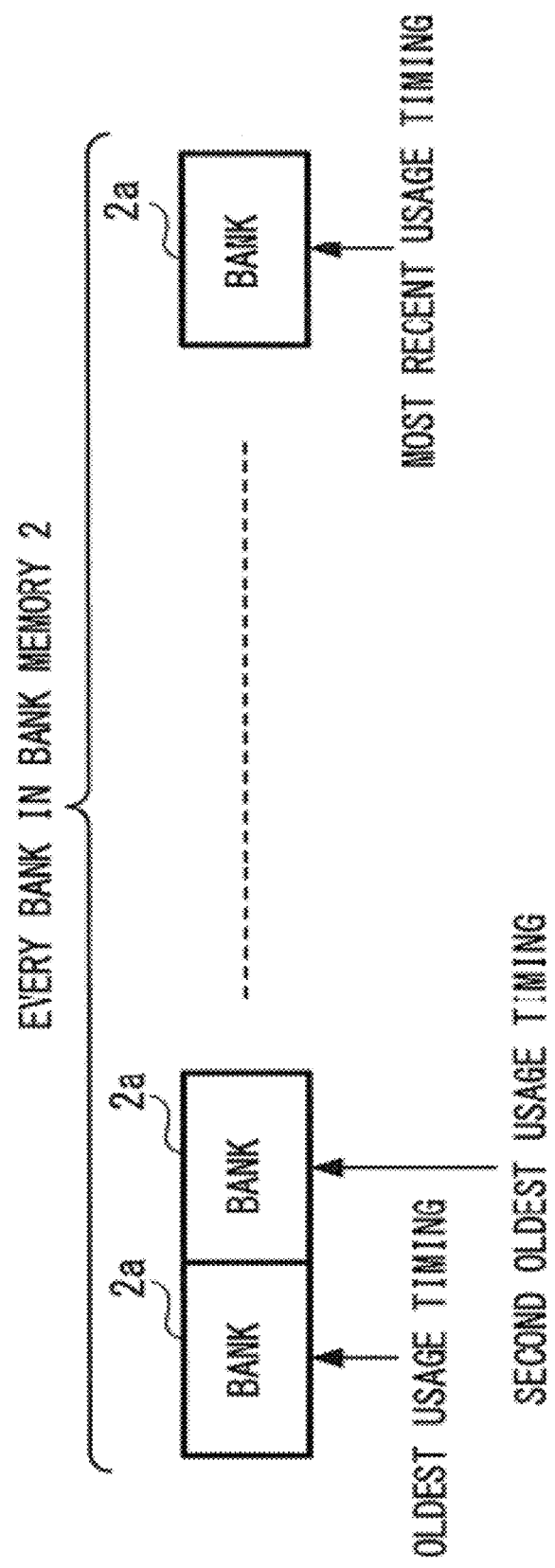
FIG. 8 is a diagram showing usage history information of each bank in the bank memory.

FIG. 8 is a diagram showing usage history information of each bank in the bank memory.

During the management of the usage history of the bank memory 2 in (d) described above, information on the usage history of the respective banks 2a is prepared based on the bank management information of the respective banks 2a. In the information on the usage history, every bank 2a is recorded in the order of the usage timings of the banks 2a. That is, as shown in FIG. 8, banks 2a that are not presently being used (i.e., banks 2a of which "Ref Counter" value in the bank management information is zero) are registered in order starting from the bank 2a with the oldest usage timing (i.e., the timing at which the "Ref Counter" value has been one or higher). When the "Ref Counter" value in the bank management information for a bank 2a is incremented due to the bank 2a having been newly reserved, the information on the usage history of such bank 2a is updated so that the bank 2a is registered as the bank 2a with the most recent usage timing.

Next, the processing of the bank memory manager BMM during the recording of AV data will be described with reference to FIG. 4. When a recording command that designates one of the SDI input/output ports has been received by the FPGA 9, the command is interpreted by the processing of the program CMD (see FIG. 3), and a command is sent to the program VDC (see FIG. 3).

The program VDC converts a serial digital signal according to SDI standard inputted into the SDI input/output port 1 to parallel AV data, encodes the parallel AV data, and supplies the encoded data to the bank memory controller 3.

Based on this command, before the AV data is encoded by the SDI input/output port 1, the program manager VDC sends a reservation request for a region in the bank memory 2 for storing the AV data to the bank memory manager BMM.

Figure 9:
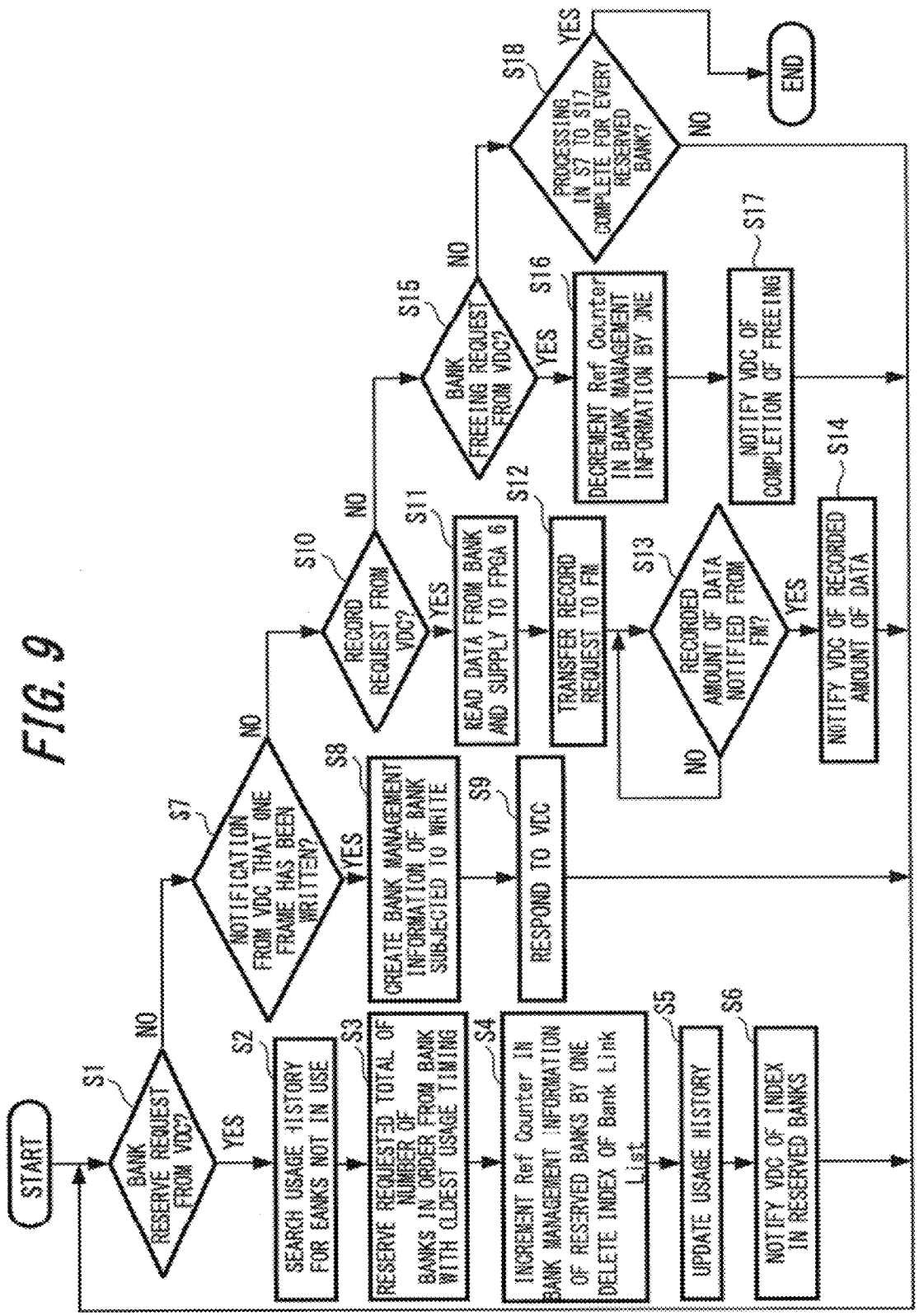
FIG. 9 is a flowchart showing the processing of the bank memory manager during recording.
Figure 10:
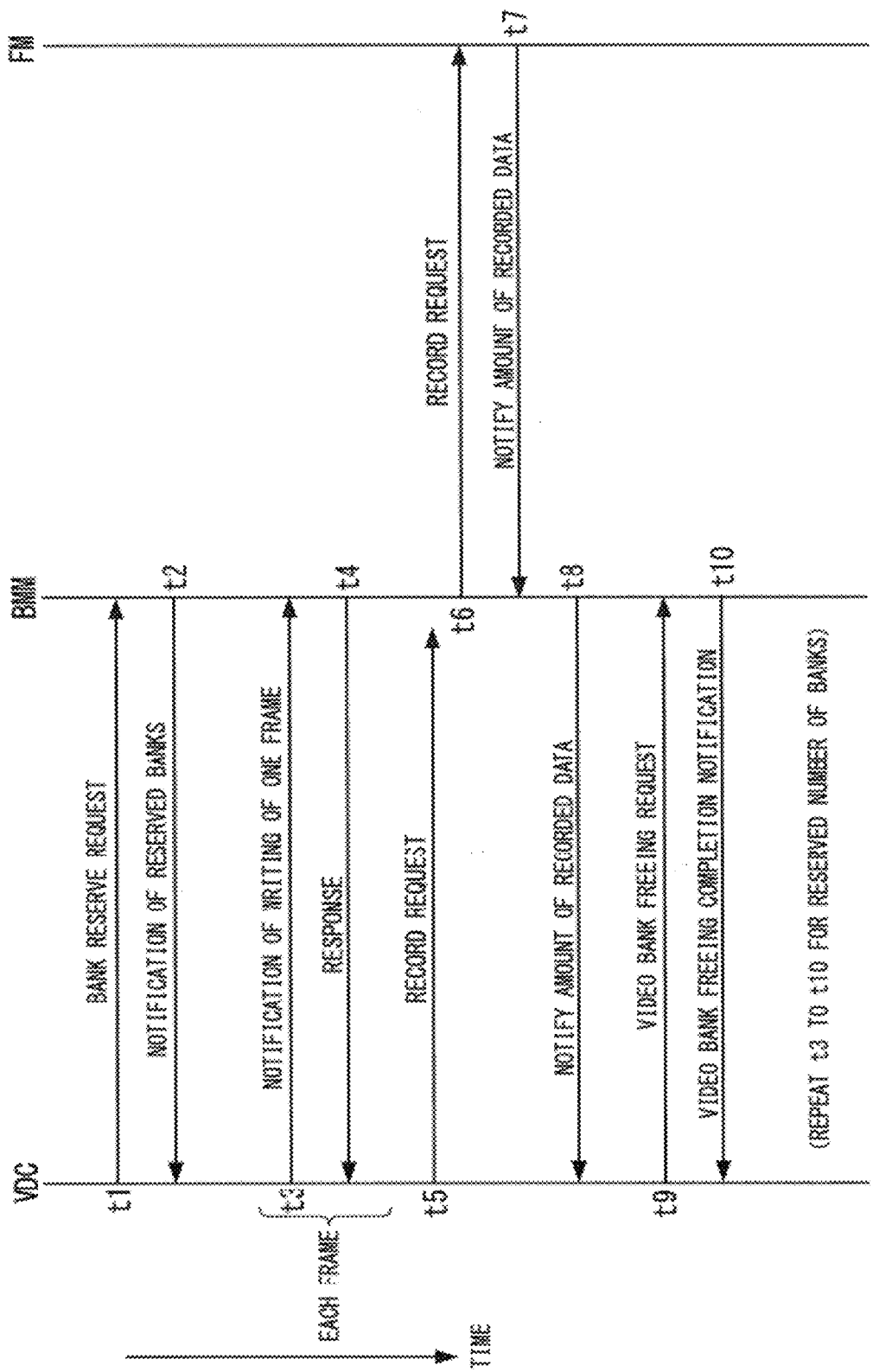
FIG. 10 is a diagram showing the communication between a program VDC, the bank memory manager, and a file manager during recording.

FIG. 9 is a flowchart showing the processing of the bank memory manager BMM based on this reservation request. FIG. 10 shows the communication between the program VDC, the bank memory manager BMM, and the file manager FM on a time axis during recording.

The program VDC sends a reservation request for a region in the bank memory 2 together with the following parameters to the bank memory manager BMM (t1 in FIG. 10).

a port number for SDI input/output port 1

ClipHandle the number of Video Banks with the number of the banks 2a reserved for video data the number of Audio Banks corresponding to the number of the banks 2a reserved for audio data On receiving the reservation request (step S1 in FIG. 9) from the program VDC, the bank memory manager BMM refers to the information on the usage history (see FIG. 8) and searches the banks 2a of the bank memory 2 for banks 2a that are not presently being used (step S2 in FIG. 9).

Subsequently, of the banks that have been found, the total number of banks 2a including the number of Video Banks and the number of Audio Banks are reserved in order starting from the oldest usage timing. Although unused, if some of the banks 2a storing audio data (case where Essence Type in FIG. 7 is audio) are associated via Bank Link List (linking information) in FIG. 7, the banks 2a are not reserved. That is, in a case where the number of banks 2a associated via Bank Link List is zero, the banks 2a will be reserved (step S3 in FIG. 9).

The banks are reserved in order starting with the oldest usage timing in step S3 so as to prevent banks 2a that have been used most recently from quickly being used to record other data. Consequently, in the processing during playback that will be described later with reference to FIG. 11 and FIG. 12, it is possible to increase the opportunities for using the stored data, to improve the responsiveness of chasing playback, and to improve the responsiveness when forward/reverse playback are repeatedly executed.

For example, there may be a case where of all the SDI input/output ports 1, data A is recorded by one port (here, Port #1), the data A is chasing played back by another port (here, Port #2), and other data (data B) is recorded by yet another port (here, Port #3). If the banks 2a that have been used by Port #1 to record the data A are then used by Port #3 to record the data B immediately after the recording of data A is completed (i.e., when such banks 2a stop being used), it will no longer be possible to use the data A stored in the banks 2a to carry out chasing playback of the data A on Port #2. Thus, to avoid the above situation, in step S3 banks are reserved in order starting from the oldest usage timing.

As shown in FIG. 9, after step S3, the value of "Ref counter" in the bank management information for each reserved bank 2a is incremented by 1. When the banks 2a storing video data have been reserved, the index of the audio bank is deleted from Bank Link List in the bank management information for the bank 2a together with the index of the video bank (step S4 in FIG. 9). The information on the usage history is updated so that the reserved banks 2a are set as the banks 2a with the most recent usage timing (step S5 in FIG. 9).

Next, as a response to the reservation request, the program VDC is informed of the index of the banks 2a reserved for video data (hereinafter also called "video bank") and the index of the banks 2a reserved for audio data (hereinafter also called "audio bank") (step S6 in FIG. 9, t2 in FIG. 10).

The program VDC controls the bank memory controller 3 to have video data encoded by the SDI input/output port 1 written into the reserved video bank for each frame and to have audio data encoded by the SDI input/output port 1 written into the reserved audio bank for each frame, of the banks 2a in the bank memory 2. Note that since the size of the audio data is less than that of the video data for each frame, audio data frames synchronized with the video data in a plurality of the video banks are written into one audio bank.

Whenever one frame of data is written in a bank 2a, the program VDC sends a notification that one frame of data has been written into a bank 2a for that bank 2a to the bank memory manager BMM (t3 in FIG. 10).

Whenever such notification for each frame is received (step S7 in FIG. 9), the bank memory manager BMM creates and updates the information (see step 7 in FIG. 7) in the bank management information for the bank 2a used for the write (step S8 in FIG. 8), and sends a response to the program VDC (step S9 in FIG. 9, t4 in FIG. 10).

FIGS. 15A, 15B, and FIGS. 16A, 16B are diagrams showing an example of how Bank Link List (linking information) of the bank management information is created and updated.

Figure 15A:
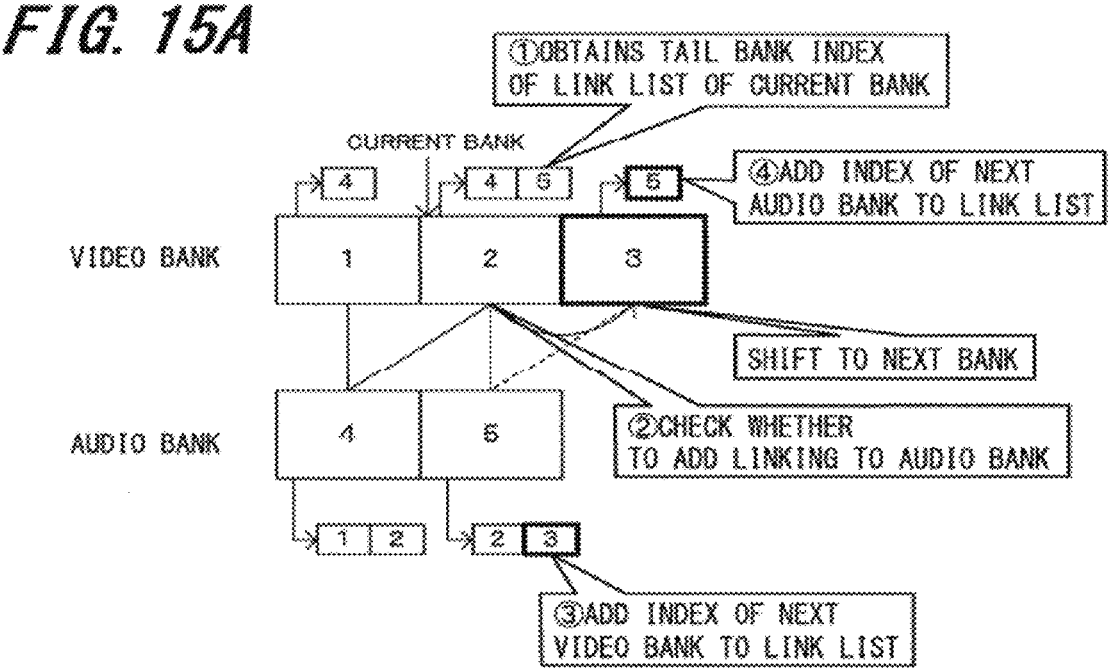
FIGS. 15A and 15B are diagrams showing an example of how the linking information between the banks is created and updated.
Figure 15B:
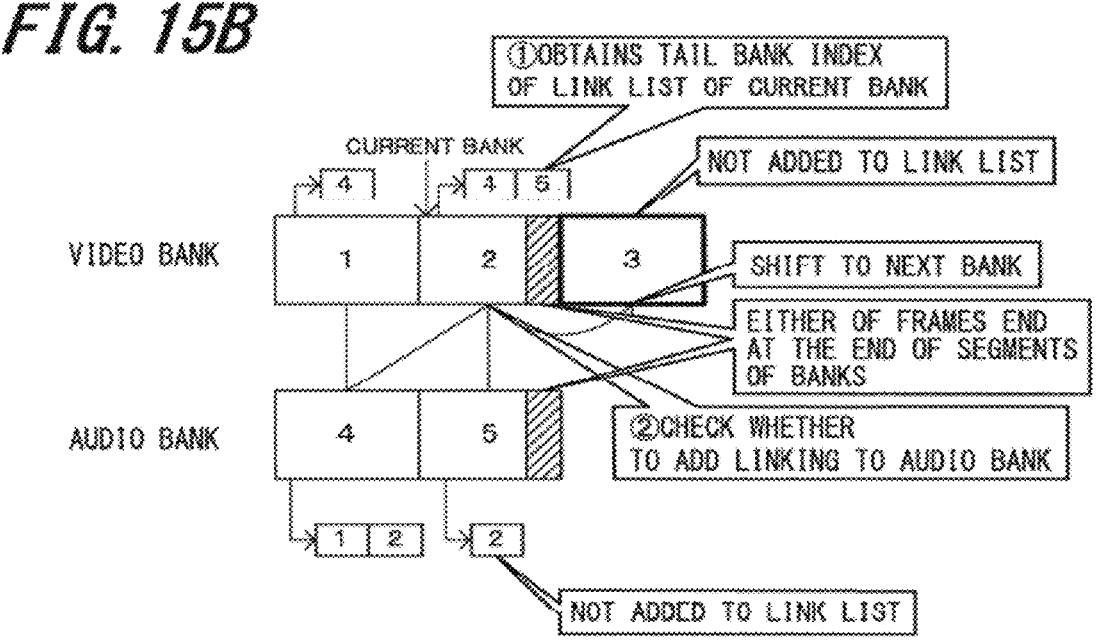

FIGS. 15A, 15B are diagrams showing an example of how Bank Link List (linking information) of the bank management information is created and updated when the processing in the video bank (Current Bank), to which video data is currently written, is shifted to the processing in the next video bank (Next Video Bank). The audio data having a frame synchronized with the video data written into the video bank with the index=1 is written into the audio bank with the index=4, and the audio data having a frame synchronized with the video data written into the video bank with the index=2 is written into the audio banks with the indices=4, 5. In the processing of this stage, Bank Link List of the video bank with the index=1 obtains the index of 4, Bank Link List of the video bank with the index=2 obtains the indices of 4 and 5, Bank Link List of the audio bank with the index=5 obtains the index of 2.

Figure 16A:
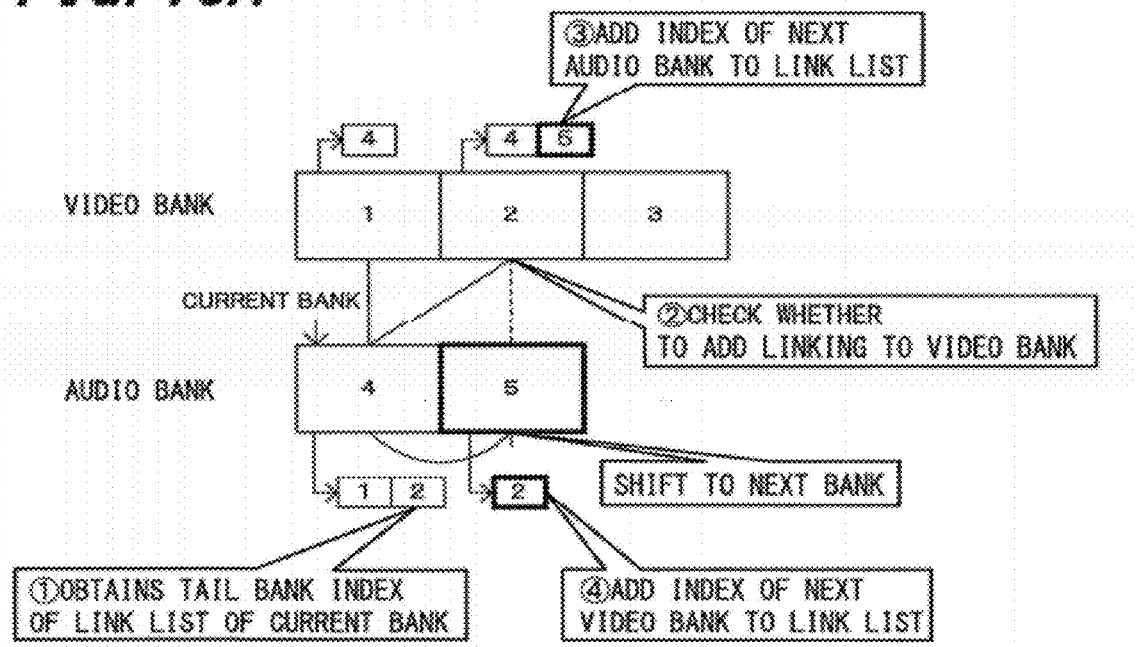
FIGS. 16A and 16B are diagrams showing an example of how the linking information between the banks is created and updated.
Figure 16B:
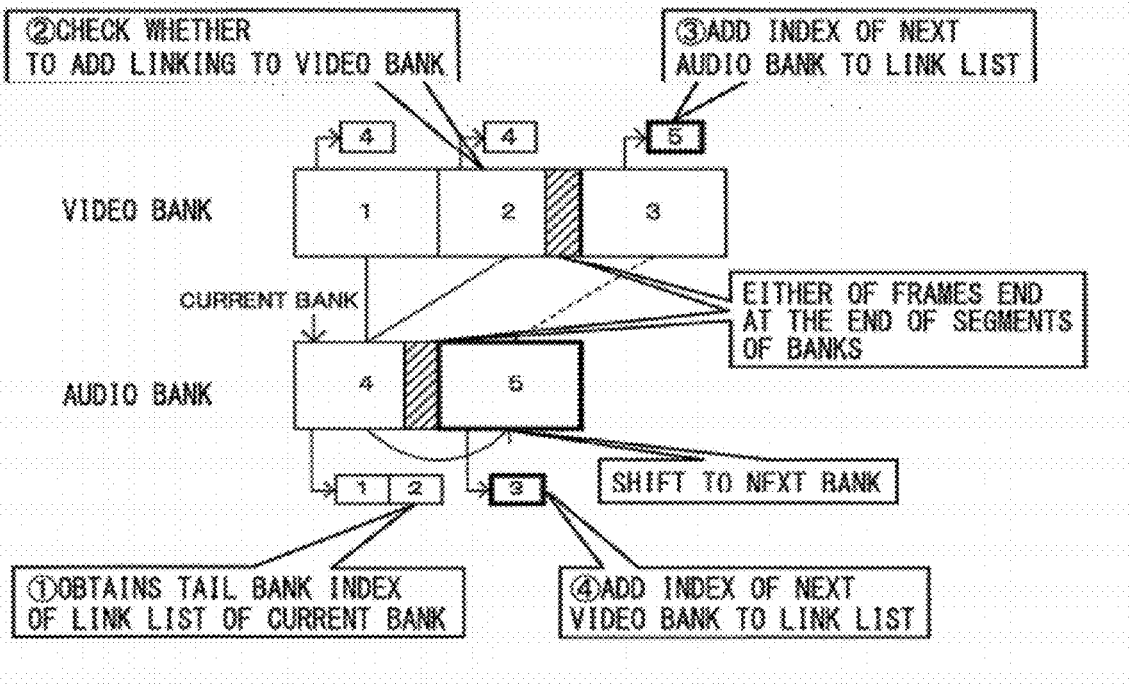

When the processing of Current Bank in this stage shifts to the processing of the next video bank, Current Bank obtains the tail index of 5 in Bank Link List thereof as shown in FIGS. 15A, 15B. Subsequently, as shown with the encircled number 2 in FIGS. 15A, 15B, whether the obtained index=5 needs to be added to the linking with the audio bank is checked. As shown in FIG. 15B, if either of frames of Current Bank and the audio bank with index=5 end at the ends of segments of the respective banks, the obtained index=5 is not added to the linking with the audio bank. If, on the other hand, either of frames of Current Bank and the audio bank with index=5 do not end at the ends of segments of the respective banks, the next video bank index of 3 is added to the Bank Link List of the audio bank with index=5 as shown in the encircled number 3 in FIG. 15A. Further, the index of 3 is added to the Bank Link List of the next video bank with index=3 as shown in the encircled number 4 in FIG. 15A. FIGS. 16A, 16B are diagrams showing an example of how Bank Link List (linking information) of the bank management information is created and updated when the processing in the audio bank (Current Bank), to which audio data is currently written, is shifted to the processing in the next audio bank (Next Video Bank). The audio data having a frame synchronized with the video data written into the video bank with the index=1 is written into the audio bank with the index=4, and the audio data having a frame synchronized with the video data written into the video bank with the index=2 is written into the audio banks with the index=4. In the processing of this stage, Bank Link List of the video bank with the index=1 obtains 4, Bank Link List of the video bank with the index=2 obtains 4, Bank Link List of the audio bank with the index=5 obtains 1 and 2. When the processing of Current Bank in this stage shifts to the processing of the next audio bank, Current Bank obtains the tail index of 2 in Bank Link List thereof as shown in FIGS. 16A, 16B.

Subsequently, as shown with the encircled number 2 in FIGS. 16A, 16B, whether the obtained index=2 needs to be added to the linking with the video bank is checked.

As shown in FIG. 16B, if either of frames of Current Bank and the video bank with index=2 end at the end of segments of the respective banks, the obtained index=2 is not added to the linking with the video bank. If, on the other hand, either of frames of Current Bank and the video bank with index=2 do not end at the ends of segments of the respective banks, the next audio bank index of 5 is added to the Bank Link List of the video bank with index=2 as shown in the encircled number 3 in FIG. 16A. Further, the index of 2 is added to the Bank Link List of the next audio bank with index=5 as shown in the encircled number 4 in FIG. 16A.

As shown in FIG. 10, when a predetermined amount of data has accumulated in the bank $2a$, the program VDC sends a recording request for the flash memory 4 to the bank memory manager BMM (t5 in FIG. 10).

On receiving the recording request (step S10 in FIG. 9), the bank memory manager BMM controls the bank memory controller 3 to have all of the data read from the bank $2a$ in question and supplied to the FPGA 6 (step S11 in FIG. 9). The bank memory manager BMM also transfers the recording request to the file manager FM (see FIGS. 3 and 4) (step S12 in FIG. 9, t6 in FIG. 10).

When a recording request is received, the file manager FM requests the file system MSFS (see FIGS. 3 and 4) to record data.

Based on the request, the data supplied to the FPGA 6 is recorded in the flash memory 4 by the processing of the file system MSFS, the main storage manager MSM, and the main storage controller MS.

When recording into the flash memory 4 is completed, the file manager FM notifies the bank memory manager BMM of the amount of data recorded as a response to the recording request (t7 in FIG. 10).

On receiving such notification from the file manager FM (step S13 in FIG. 9), the bank memory manager BMM notifies the program VDC of the amount of data recorded indicated by the file manager FM as a response to the recording request (step S14 in FIG. 9, t8 in FIG. 10).

On receiving such notification that the recording of the data that had accumulated in the video bank in the flash memory 4 has been completed, the program VDC sends a freeing request for such video bank the video bank to the bank memory manager BMM (t9 in FIG. 10).

On receiving the freeing request (step S15 in FIG. 9), the bank memory manager BMM decrements the value of "Ref Counter" in the bank management information for the bank $2a$ indicated by the address x by one while leaving the information from "Essence Type", "EOF Flag", "File Address", "TOP Frame", and "Frame Num" in the bank management information (step S16 in FIG. 9). Further, the bank memory manager BMM decrements the value of "Ref Counter" by one in the bank management information for the audio bank associated with the video bank via Bank Link List (linking information) in the bank management information (step S16 in FIG. 9). After this, the bank memory manager BMM notifies the program VDC that the freeing has been completed (step S17 in FIG. 9, t10 in FIG. 10).

Note that since there are cases where the program VDC will request a retrying of recording when recording in the flash memory 4 has failed, the bank memory manager BMM does not free the bank $2a$ until a freeing request has been received from the program VDC.

When the processing in steps S7 to S17 in FIG. 9 has been completed for every reserved bank $2a$ (step S18 in FIG. 9), the processing in FIG. 9 is completed.

Next, the processing of the bank memory manager BMM during playback of clips will be described. When a playback command that designates one of the SDI input/output ports has been received by the FPGA 9, the command is interpreted by the processing of the program CMD (see FIG. 3), and a command is sent to the program VDC (see FIG. 3).

Figure 11:
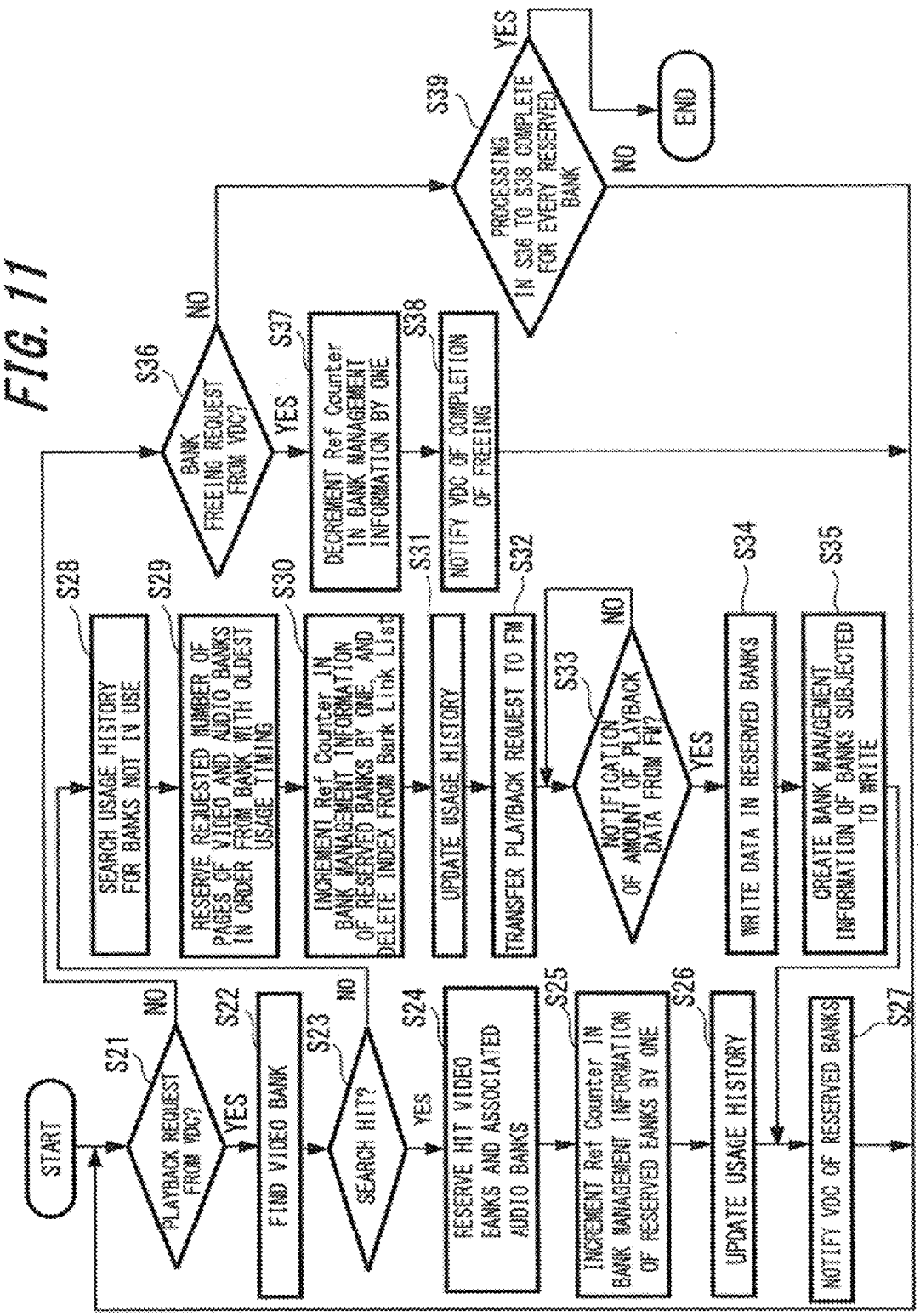
FIG. 11 is a flowchart showing the processing of the bank memory manager during playback.
Figure 12:
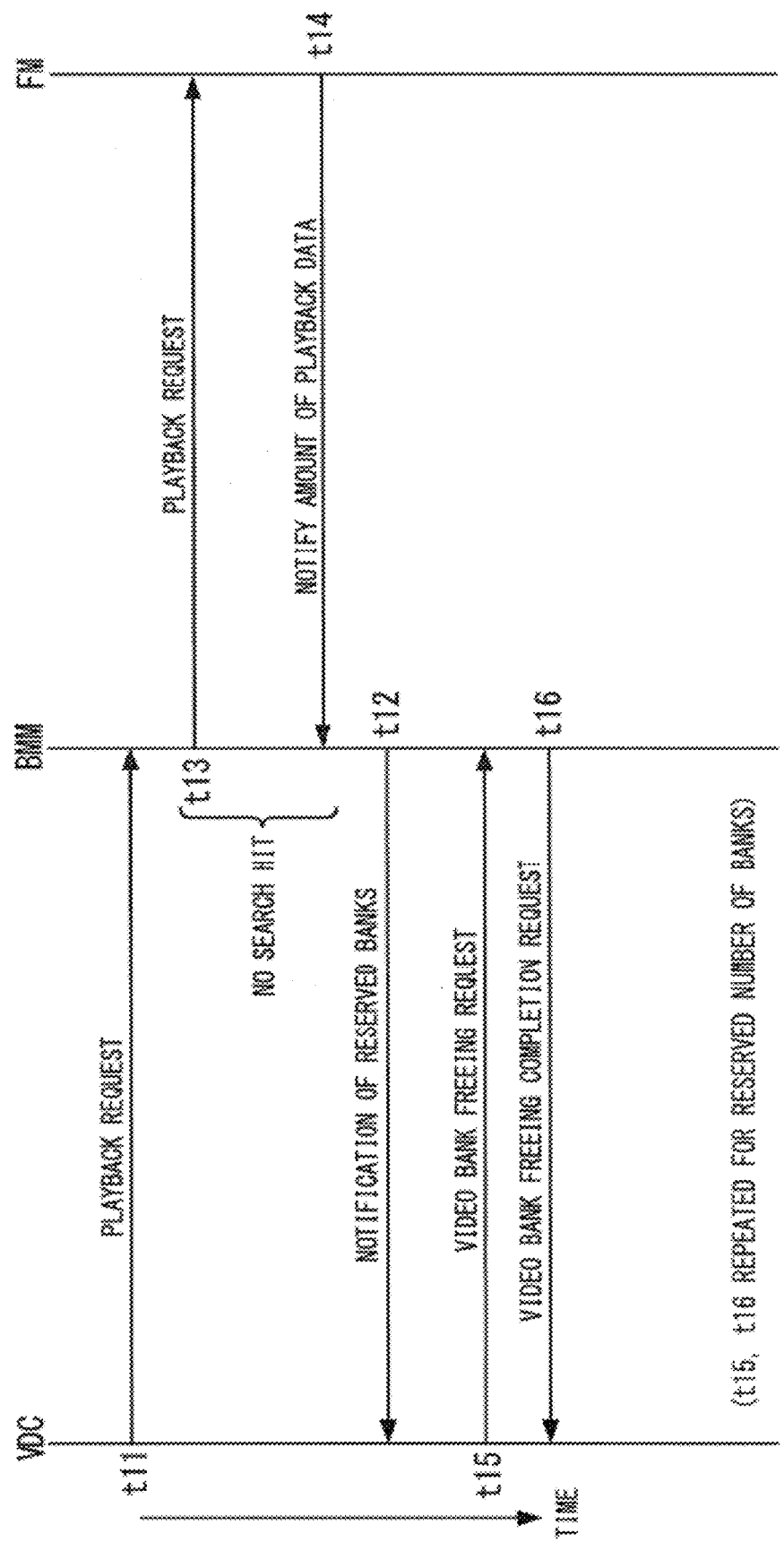
FIG. 12 is a diagram showing the communication between the program VDC, the bank memory manager, and the file manager during playback.

Based on this command, the program VDC sends a playback request for the clips to the bank memory manager BMM. FIG. 11 is a flowchart showing the processing of the bank memory manager BMM based on this playback command. FIG. 12 shows the communication between the program VDC, the bank memory manager BMM, and the file manager FM on a time axis during playback.

The program VDC sends a playback request for AV data together with the following parameters to the bank memory manager BMM (t11 in FIG. 12).

a port number for SDI input/output port 1
    ClipHandle
    File Address for a playback video file
    the number of pages for a playback video file
    the number of pages for a playback audio file
    the first frame number in first playback video file
    the number of frames in first playback video file
    the number of frames in next playback video file When the first frame in the first video bank goes across the boundary of the page, the frame number of the first frame is obtained from the frame corresponding to that page with the boundary.

On receiving the playback request (step S21 in FIG. 11), the bank memory manager BMM compares parameters of the video received together with the playback request, and the bank management information (see FIG. 7) prepared for the respective banks 2a (including bank 2a with Ref Counter of value "0") of the bank memory 2 to search for the bank 2a of which bank management information match the playback request for the video file (step S22 in FIG. 11).

As shown in FIG. 11, after step S22, whether there is a search hit is determined (i.e., whether a matching bank 2a has been found) (step S23 in FIG. 11). If the result is "YES", the video banks found as the hit are reserved together with the audio banks associated with the video banks via Bank Link List (linking information) in the bank management information (step S24 in FIG. 11). After this, the value of "Ref Counter" in the bank management information for the reserved banks 2a is incremented by one (step S25 in FIG. 11) and the usage history information is updated to register the reserved banks 2a as the banks with the most recent usage timing (step S26 in FIG. 11).

Subsequently, as a response to the playback request, the indices of the reserved video banks and audio banks are notified to the program VDC (step S27 in FIG. 11, t12 in FIG. 12).

If the determination result is "NO" in step S23, the usage history information is referred to (see FIG. 8) and of the banks 2a of the bank memory 2, a search is conducted for banks 2a that are presently not being used (step S28 in FIG. 11). Next, of the banks that have been found, the number of video banks and audio banks with the number of pages for which playback has been requested are reserved in order starting from the oldest usage timing. Although unused, if some of the banks 2a storing audio data (case where Essence Type in FIG. 7 is audio) are associated with the banks 2a storing video data via Bank Link List (linking information) in FIG. 7, the banks 2a are not reserved. That is, in a case where the number of banks 2a associated via Bank Link List is zero, the banks 2a will be reserved (step S29 in FIG. 11).

The value of "Ref counter" in the bank management information for each reserved bank 2a is incremented by 1. When the bank 2a storing video data has been reserved, the index of the audio bank is deleted from Bank Link List in the bank management information for the bank 2a together with the index of the video bank. Specifically, when the video bank with the index=1 shown in FIG. 15A is reserved, the index of 4 is deleted from Bank Link List with the video bank with the index=1, and the index of 1 is deleted from Bank Link List with the audio bank with index=4 (step S30 in FIG. 11). The information on the usage history is updated so that the reserved banks 2a are set as the banks 2a with the most recent usage timing (step S31 in FIG. 11).

Next, a playback request from the program VDC is transferred to the file manager FM (see FIGS. 3 and 4) (step S32 in FIG. 11, t13 in FIG. 12).

When a playback request is tr, the file manager FM requests the file system MSFS (see FIGS. 3 and 4) to playback data.

Based on this request, data is played back from the flash memory 4 and supplied to the bank memory controller 3 by the processing of the file system MSFS, the main storage manager MSM, and the main storage controller MS.

When playback from the flash memory 4 or the optical disc drive 5 is completed, the file manager FM notifies the bank memory manager BMM of the amount of data played back as a response to the playback request (t14 in FIG. 12).

On receiving such notification from the file manager FM (step S33 in FIG. 11), the bank memory manager BMM controls the bank memory controller 3 to have video data and audio data written into the reserved video bank and audio bank, respectively (step S34 in FIG. 11). Next, the bank management information (see FIG. 7) is prepared for the banks 2a for which a write has been carried out (step S35 in FIG. 9) and the processing then proceeds to step S27 in FIG. 11, t12 in FIG. 12.

On receiving the notification in step S27 in FIG. 11 and t12 of FIG. 12, the program VDC controls the bank memory controller 3 to have data requested for playback read from the reserved banks 2a and supplied to the SDI input/output port 1.

Next, when data with the number of pages requested for playback has been read, the program VDC sends a freeing request for the bank(s) 2a to the bank memory manager BMM (t15 in FIG. 12).

On receiving the freeing request (step S36 in FIG. 11), the bank memory manager BMM carries out the same processing as in steps S16 and S17 during recording that is shown in FIG. 9 (S37 and S38 in FIG. 11, t16 in FIG. 12).

When the processing in steps S36 to S38 in FIG. 11 has been completed for every reserved bank 2a (step S39 in FIG. 11), the processing shown in FIG. 11 is completed.

Figure 13:
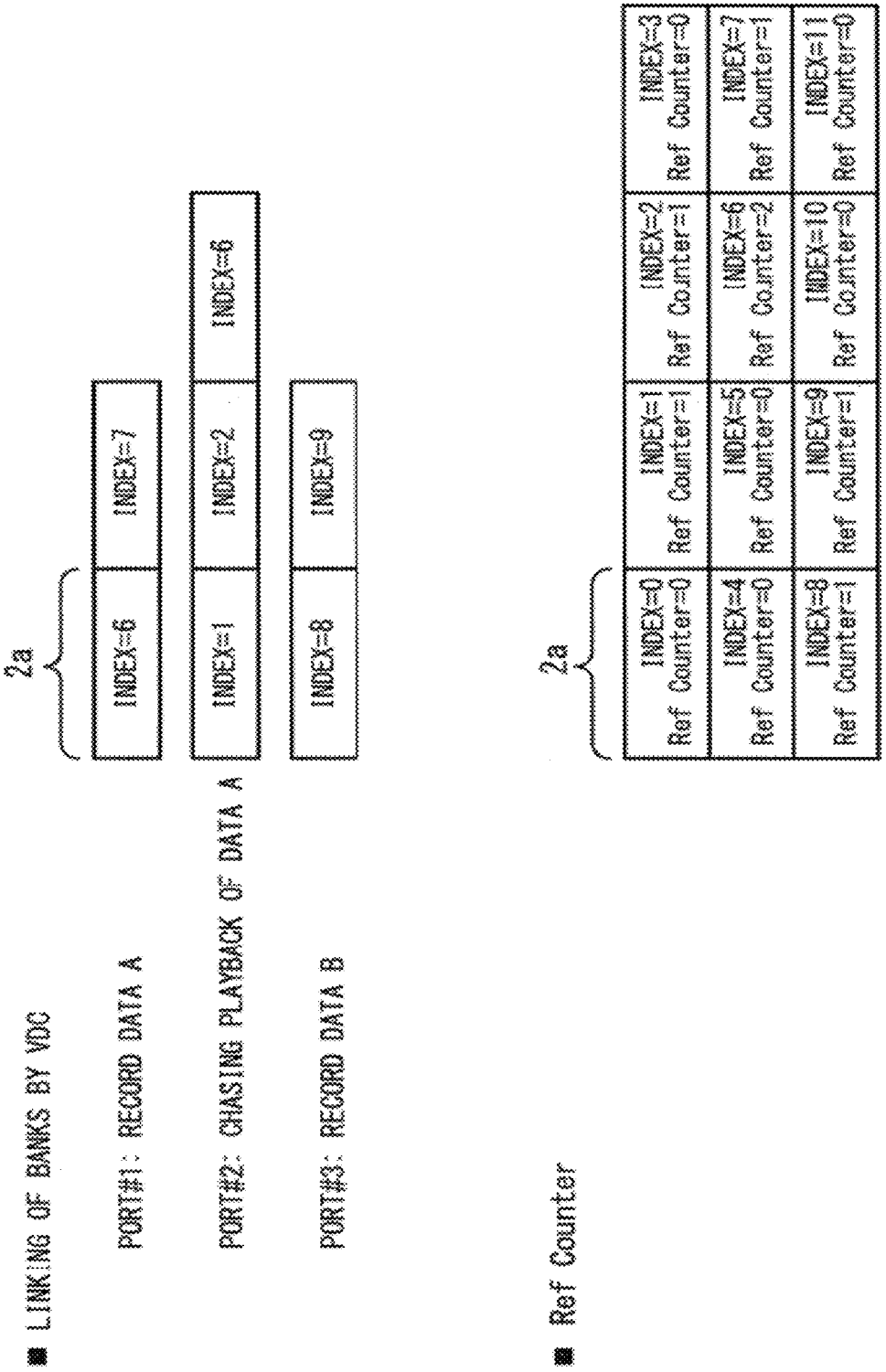
FIG. 13 is a diagram showing representations of reference counter (Ref counter) of the banks in the bank memory and the linking of banks by the program VDC.

FIG. 13 shows a representation of Ref Counter in the bank management information reserved as a video bank for the banks 2a of the bank memory 2 during the processing shown in FIGS. 9 and 11 and a representation of the linking of banks 2a (the linking between the video banks, which is a separate concept from bank Link List in the bank management information) for the three ports (indicated as Ports #1 to #3) of all of the SDI input/output ports 1 by the program VDC.

In FIG. 13, an example is shown where data A is recorded by Port #1, other data C is subjected to forward playback using the banks 2a with the indices=0 to 2 before chasing playback starts for video data A by Port #2, and other video data B is recorded by Port #3.

The program VDC manages a plurality of banks 2a being used by the corresponding SDI input/output port 1 by linking the banks 2a for a predetermined number of bytes centered on the position of the bank 2a for which a read or write is presently being carried out.

The program VDC links a bank 2a with the index=6 and a bank 2a with the index=7 as the banks 2a being used by Port #1.

When chasing playback of the data A starts, the program VDC links the bank 2a with the index=1, the bank 2a with the index=2, and the bank 2a with the index=6 as the banks 2a being used by Port #2. (although not shown in the drawings, the banks 2a with the indices=0 to 2 are linked during forward playback of data C, and when chasing playback of the data A starts, the bank 2a with the index=0 is unlinked and the bank 2a with the index=6 is newly linked).

The program VDC links a bank 2a with the index=8 and a bank 2a with the index=9 as the banks 2a being used by Port #3.

The "Ref Counter" value in the bank management information for the bank 2a with the index=7 used by only Port #1, the banks 2a with the indices=1, 2 used by only Port #2, and the banks 2a with the indices=8, 9 used by only Port #3 is set at "1".

The "Ref Counter" value in the bank management information for bank 2a with the index=6 used by both Port #1 and Port #2 is set at "2". Here, even if recording of the data that has accumulated in the bank 2a with the index=6 in the flash memory 4 is completed and the bank 2a with the index=6 is freed by a freeing request by the program VDC for Port #1, the "Ref Counter" value in the bank management information will still only be "1", so that the bank 2a with the index=6 is not placed in the unused state (i.e., such bank 2a is still being used by Port #2).

Since the remaining banks 2a are not used by any of the SDI input/output ports 1, the "Ref Counter" value in the bank management information is zero.

Since video data that is stored during use remains in the banks 2a that are no longer used, such video data can be used for playback. For example, for Port #2, if the data C is subjected to reverse playback after chasing playback of the data A, data will remain in the bank 2a with the index=0 that has been unlinked, and therefore it will be possible to carry out reverse playback using the banks 2a with the indices=2, 1, 0 in that order immediately without accessing the flash memory 4 (i.e., the program VDC for Port #2 unlinks the bank 2a with the index=6 and newly links the bank 2a with the index=0).

FIGS. 14A and 14B are diagrams showing an example of how chasing playback is carried out on video data by the processing in FIGS. 9 and 11 using the bank memory 2. Note that the banks 2a have a size of 60 pages in FIGS. 14A, 14B.

In FIG. 14A, recording by the processing described in FIG. 9 is shown divided into four stages on the time axis. The first stage in FIG. 14A shows a state where the video banks are yet to be reserved.

The second stage in FIG. 14A shows a state immediately after two banks 2a with a "Ref Counter" value zero (i.e., banks 2a that store video data) have been reserved as video banks, where the writing of video data from the first frame (i.e., the first page) into the first reserved bank 2a (the bank 2a on the left in the drawing of the two reserved banks 2a) has started.

The third stage in FIG. 14A shows a state immediately after the recording of around 30 frames (i.e., fifty pages) of video data that have accumulated in the first bank 2a in the flash memory 4 has been completed and such bank 2a has been freed, where the writing of video data from around the thirty-first frame (i.e., the fifty-first page) into the second reserved bank 2a has started.

The fourth stage in FIG. 14A shows a state after the time equivalent to around fifteen frames has passed following the third stage, where video data of around fifteen frames (thirty pages) has been written in the reserved second bank 2a but such video data has not yet been recorded in the flash memory 4.

FIG. 14B shows a state where chasing playback of video data from around the twenty-fifth frame (the fortieth page) to the fortieth frame (the sixty-fifth page) is carried out by the processing in FIG. 11 at the same timing as the fourth stage in FIG. 14A.

The first bank 2a that has been used for recording is reserved again, and of the approximately thirty frames (fifty pages) of video data remaining in such bank 2a, the video data from approximately the twenty-fifth frame (fortieth page) to the thirtieth frame (fiftieth page) is read out.

The second bank 2a that is presently being used for recording is also reserved, and of the approximately fifteen frames (thirty pages) of data stored in the bank 2a (i.e. video data yet to be recorded in the flash memory 4), approximately ten frames (fifteen pages) of video data from the start, that is, video data from the equivalent of the thirty-first frame (fifty-first page) to the fortieth frame (sixty-fifth page) is read out from the first bank 2a.

As shown in FIGS. 14A and 14B, in this AV server, there are many cases where the bank memory 2 is used as a cache memory so that chasing playback can be carried out at high speed without the flash memory 4 being accessed (that is, without being affected by an access wait time for the flash memory 4 due to time slot management). In this manner, it is possible to improve the responsiveness of chasing playback.

Using video data as a master essence of two types of essence including video data and audio data forming a clip, Bank Link List (linking information) showing an association between the video bank storing video data and the audio bank storing audio data in the banks 2a of bank memory 2 is prepared, and a search is conducted only for the video bank during playback whereas the audio bank is reserved using Bank Link List (steps S21 to S25 in FIG. 11). Accordingly, even if video data and audio data, both forming a clip, are recorded as separate files, since it may not be necessary to conduct a search for whether the bank memory 2 includes each type of essences (video data or audio data), search processing can be simplified.

Even though the audio banks are unused (i.e., the value of Ref Counter in the bank management information is zero), the audio banks are not subject to be reserved for recording of new data insofar as there are some video banks associated with the audio banks via Bank Link List. However, if the number of the video banks associated with the audio banks via Bank Link List is zero; that is, all the video banks associated with the audio banks via Bank Link List are freed, the audio banks are subject to be reserved for recording of new data (step S3 in FIG. 9, step S29 in FIG. 11). Specifically, the audio banks will not be freed unless all the video banks associated with the audio banks via Bank Link List are freed to be reserved for recording of new data. If there remain some video data in the frames in the bank memory 2, the audio data synchronized with the video data will remain in the bank memory 2. Thus, even though video data and audio data, both forming a clip, are recorded as separate files, chasing playback of the entire clip can be carried out using the bank memory 2 as a cache memory.

Also, as described for Port #2 in FIG. 13, since there is a high probability of data remaining in banks 2a that have been unlinked when reverse playback is carried out after forward playback, reverse playback can be carried out at high speed using the bank memory 2 as a cache memory without accessing the flash memory 4. As a result, it is possible to improve the responsiveness during repeated forward/reverse playback.

By using the bank memory 2 as a cache memory as described above, it is possible to reduce the number of accesses to the flash memory 4, resulting in an increase in the number of free time slots managed by the main storage manager MSM (see FIGS. 3 and 4). This leads to improved responsiveness during recording and normal playback that access the flash memory 4.

The functions of the bank memory manager BMM are not limited to chasing playback and forward/reverse playback during normal operation and can also be used when debugging is carried out using the bank memory 2 during diagnostics on the AV server. Although an existing AV server is provided with a dedicated program for such debugging in the bank memory, according to an embodiment of the present invention it may not be necessary to provide such dedicated program.

The embodiments described above are applied to cases where video data and audio data of the two types of essence forming a clip are recorded as separate files. However, the embodiments are not limited thereto; and the embodiments can also be applied to cases where the three or more types of essence (i.e., video data with low-resolution used for editing;

and real time metadata other than video data and audio data) forming a clip are recorded as separate files. For example, according to the embodiments, when having created the linking information that indicates an association between a region storing one of the types of essence as a master essence and regions storing the remaining types of essence, and processing shown in FIGS. 9 to 12 are carried out, chasing playback of the entire clip can be carried out using the bank memory 2 as a cache memory.

Although the invention is applied to an AV server with a flash memory as main storage and an editing function in the example described above, the present invention can also be applied to an AV server that uses main storage that is not flash memory (for example, a hard disk drive), an AV server that does not have an editing function, and a non-linear editor for TV broadcasts. In addition, the present invention is not limited to an AV server or a non-linear editor for TV broadcasts and can also be applied to all kinds of data processing apparatuses that access a non-linear recording medium from two or more input/output ports to record and play back video data.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:
a plurality of ports comprising a port configured to input and/or output a clip, the clip including a plurality of types of essence, the plurality of types of essence including a master essence type and a remaining essence type;
a memory accessible to the plurality of ports and configured to store at least a portion of a first clip during recording of the first clip to a recording medium and/or playing back of the first clip from the recording medium;
a generator configured to store first master essence of the first clip in one or more first regions of the memory and associated remaining essence of the first clip in one or more second regions of the memory, to generate identification information that identifies the types of essence stored in the one or more first and second regions of the memory, and to generate linking information that indicates an association between a first region of the one or more first regions of the memory storing at least a portion of the first master essence and an associated region of the one or more second regions of the memory storing at least a portion of the associated remaining essence; and
a control unit configured to send to a designated port of the plurality of ports the first master essence and the associated remaining essence associated therewith via the linking information, in a case where the first clip is subjected to a playback request that identifies the designated port,
wherein the control unit is configured to compute whether the first master essence of the first clip is stored in the memory using the identification information generated by the generator,
wherein a frame of the master essence type contains an amount of data greater than a frame of the remaining essence type contains,
wherein the generator is configured to generate region management information comprising one or more respective numbers of reservations for the one or more first regions of the memory storing the first master essence, and to generate region usage history information based on the generated management information,
wherein the control unit is configured to store a first portion of second essence of a second clip in a region of the memory that has an oldest usage timing among regions of the memory that have zero reservations and hold essence of the master type, in a case where the first master essence of the first clip is stored in the memory and a recording request for the second clip is received,
wherein the control unit is configured to store a second portion of the second essence of the second clip in an unlinked region of the memory storing essence of the remaining type, the unlinked region being associated, via the linking information, with zero regions that hold essence of the master type,
wherein the generator is configured to store the identification information on the regions that have zero reservations, the identification information being generated when the regions are reserved and/or freed, and
wherein the control unit is configured to compute, using the identification information, whether the first master essence is stored in a region of the memory that has zero reservations.

2. The data processing apparatus according to claim 1, wherein:
when a predetermined amount of essence has accumulated in a region of the memory, the essence in the region of the memory is recorded on the recording medium; and
the generator is configured to generate the identification information when an amount of essence less than the predetermined amount of essence has been recorded in the region of the memory.

3. The data processing apparatus according to claim 1, wherein the first master essence includes video data and the associated remaining essence includes audio data.

4. The data processing apparatus according to claim 1, further comprising the recording medium.

5. A playback method for a recording and/or playback apparatus including a plurality of ports and a memory, the plurality of ports including a port configured to input and/or output a clip including a plurality of types of essence, the plurality of types of essence including a master essence type and a remaining essence type, the method comprising:
storing first master essence of a first clip in one or more first regions of the memory and associated remaining essence of the first clip in one or more second regions of the memory;
generating identification information that identifies the types of essence stored in the one or more first and second regions of the memory;
generating linking information that indicates an association between a first region of the one or more first regions of the memory storing at least a portion of the first master essence and an associated region of the one or more second regions of the memory storing at least a portion of the associated remaining essence;
sending to a designated port of the plurality of ports the first master essence and the associated remaining essence associated therewith via the linking information in a case where the first clip is subjected to a playback request that identifies the designated port;
computing whether the first master essence of the first clip is stored in the memory using the identification information;
generating region management information comprising one or more respective numbers of reservations for the one or more first regions of the memory storing the first master essence;

generating region usage history information based on the generated management information;

in a case where a recording request for a second clip is received and the first master essence of the first clip is stored in the memory, storing a first portion of second essence of the second clip in a region of the memory that has an oldest usage timing among regions of the memory that have zero reservations and hold essence of the master type, storing a second portion of the second essence of the second clip in an unlinked region of the memory storing essence of the remaining type, the unlinked region being associated, via the linking information, with zero regions that hold essence of the master type;

storing the identification information on the regions that have zero reservations, the identification information being generated when the regions are reserved and/or freed; and computing, using the identification information, whether the first master essence is stored in a region of the memory that has zero reservations, wherein the memory is accessible to the plurality of ports and is configured to store at least a portion of the first clip during recording of the first clip to a recording medium and/or playing back of the first clip from the recording medium, and wherein a frame of the master essence type contains an amount of data greater than a frame of the remaining essence type contains.

6. The playback method according to claim 5, wherein the first master essence of the first clip comprises video data.

7. A data processing system comprising: two or more data processing devices comprising a first data processing device and a second data processing device, the first data processing device being coupled to the second data processing device, the first data processing device comprising:

a plurality of ports comprising a port configured to input and/or output a clip, the clip including a plurality of types of essence, the plurality of types of essence including a master essence type and a remaining essence type;

a memory accessible to the plurality of ports and configured to store at least a portion of a first clip during recording of the first clip to a recording medium and/or playing back of the first clip from the recording medium;

a generator configured to store first master essence of the first clip in one or more first regions of the memory and associated remaining essence of the first clip in one or more second regions of the memory, to generate identification information that identifies the types of essence stored in the one or more first and second regions of the memory, and to generate linking information that indicates an association between a first region of the one or more first regions of the memory storing at least a portion of the first master essence and an associated region of the one or more second regions of the memory storing at least a portion of the associated remaining essence; and a control unit configured to send to a designated port of the plurality of ports the first master essence and the associated remaining essence associated therewith via the linking information, in a case where the first clip is subjected to a playback request that identifies the designated port, wherein the plurality of ports of the first data processing device are configured to access the recording medium associated with the first data processing device and a second recording medium associated with the second data processing device, wherein the control unit is configured to compute whether the first master essence of the first clip is stored in the memory using the identification information generated by the generator, wherein a frame of the master essence type contains an amount of data greater than a frame of the remaining essence type contains, wherein the generator is configured to generate region management information comprising one or more respective numbers of reservations for the one or more first regions of the memory storing the first master essence, and to generate region usage history information based on the generated region management information, wherein the control unit is configured to store a first portion of second essence of a second clip in a region of the memory that has an oldest usage timing among regions of the memory that have zero reservations and hold essence of the master type, in a case where the first master essence of the first clip is stored in the memory and a recording request for the second clip is received, wherein the control unit is configured to store a second portion of the second essence of the second clip in an unlinked region of the memory storing essence of the remaining type, the unlinked region being associated, via the linking information, with zero regions that hold essence of the master type, wherein the generator is configured to store the identification information on the regions that have zero reservations, the identification information being generated when the regions are reserved and/or freed, and wherein the control unit is configured to compute, using the identification information, whether the first master essence is stored in a region of the memory that has zero reservations.

8. The data processing system according to claim 7, wherein the first master essence of the first clip comprises video data.

* * * * *